(12) United States Patent
Haj-Ahmad (10) Patent No.: US 7,431,842 B2
(45) Date of Patent: Oct. 7, 2008

(54) METHOD OF USING SILICON CARBIDE FOR REMOVAL OF ADVENTITIOUS AGENTS

(75) Inventor: Yousef Haj-Ahmad, Thorold (CA)

(73) Assignee: Norgen Biotek Corporation, Ontario (CA)

( * ) Notice: Subject to any disclaimer, the term of this patent is extended or adjusted under 35 U.S.C. 154(b) by 0 days.

(21) Appl. No.: 11/637,876

(22) Filed: Dec. 13, 2006

(65) Prior Publication Data

US 2008/0142445 A1 Jun. 19, 2008

(51) Int. Cl.
B01D 15/00 (2006.01)
(52) U.S. Cl. ........................ 210/656; 210/660; 210/679; 210/690
(58) Field of Classification Search ................. 210/679, 210/690–691, 645, 656, 660–661
See application file for complete search history.

(56) References Cited

U.S. PATENT DOCUMENTS 5,830,360 A * 11/1998 Mozayeni ................... 210/651

| 6,565,754 B1 * | 5/2003 | Codignola et al. .......... 210/684 |
| 2004/0198845 A1 * | 10/2004 | Wang et al. ................. 518/703 |
| 2006/0110308 A1 * | 5/2006 | Gupta et al. ................ 423/345 |
| 2007/0037225 A1 * | 2/2007 | Metzger et al. ............ 435/7.22 |

FOREIGN PATENT DOCUMENTS

JP 59059233 A * 4/1984

* cited by examiner

*Primary Examiner*—Chester T. Barry
(74) *Attorney, Agent, or Firm*—Myers Bigel Sibley & Sajovec, P.A.

(57) ABSTRACT

A method of using silicon carbide for removing adventitious materials such as endotoxins, prions, viruses and bacteria from water, buffers, aqueous solutions or biological preparations of DNA or proteins, or any combination thereof. The present invention provides for a method of removing adventitious materials from a fluid by passing the fluid through a column or filter bed comprised of silicon carbide particles, or by passing the fluid through a silicon carbide slurry. The method reduces at least 90% of bacteria and endotoxins. It is an economical, reproducible and regenerable process for removing adventitious materials from various fluids.

17 Claims, 6 Drawing Sheets

Figure 6

METHOD OF USING SILICON CARBIDE FOR REMOVAL OF ADVENTITIOUS AGENTS

FIELD OF THE INVENTION

This invention relates to a method of using silicon carbide for the removal of adventitious agents from fluids.

BACKGROUND OF THE INVENTION

There has long been and continues to be a need for effectively removing impurities and adventitious materials, such as viruses, endotoxins, prions and bacteria, from fluids, including biological fluids, to be used for administration to humans or animals. The removal of these adventitious materials is often required for use of such fluids in research and medical procedures. These substances may cause an adverse reaction to the host, and thus standards have been set by regulatory bodies for the acceptable levels of such substances in biological fluids which can not be exceeded. These fluids can include, but are not limited to, protein solutions, DNA solutions, buffers and the water used for their preparation. Such biological fluids have applications in human gene therapy, as well as vaccines and other pharmaceuticals.

Similarly, it is important to remove adventitious agents such as viruses, endotoxins, prions and bacteria from water sources. Purified water has many applications from drinking water, to uses in dental and medical offices, to the production of various pharmaceutical-grade protein and DNA solutions used in research and medical procedures in humans and animals.

While there are many different separation methods available to remove contaminants from biological fluids and water, chromatography processes and filtration have been the most commonly used. Chromatography has been a long standing method because it allows for the selective removal of contaminants from biological fluids. In general, chromatography allows for the separation of molecules based on differences in their structure and/or composition. It is important, however, that the method of chromatography chosen be effective in removing the adventitious material while leaving the biological of interest (protein or DNA) behind.

The process of filtration refers to forcing a particle-laden liquid through a filter fabric or media of predetermined pore size. The driving force can be gravity, pressure or vacuum. Suspended particles in the feed stream are trapped on the surface of the filter media while the clarified liquid passes through the filter. To function as a filter, media must allow the fluid, commonly water, through while holding back the particulate contaminant. This holding back of the contaminant is accomplished by one or both of two distinctly different filtration mechanisms, namely (1) mechanical straining, and (2) adsorption.

Viral contamination can often be found in biological fluids, and is deemed unacceptable for preparations to be used for administration to humans. Furthermore, various regulatory agencies have suggested that viruses be reduced in drinking water by 99.99%. A number of different methods have been developed for the removal of various viruses from these liquids. The two main methods involve chromatography with some type of material or resin, and filtration.

Various different types of chromatographic materials have been used for virus removal from liquids. The structure and properties of viruses vary considerably, and thus the resin or material used in the chromatography application for the removal of viruses is often specific for a certain virus or family of viruses. A method for the separation of viruses, including retroviruses and viral vectors, from biological therapeutics is disclosed in U.S. Pat. No. 5,447,859. This method relies on the use of sulfated oligosaccharides, including cellulose, to bind and elute the virus. In U.S. Pat. No. 4,869,826 cellular adsorbents for the removal of viral contaminants from whole blood and protein solutions are prepared by immobilizing and stabilizing cells or portions of cellular receptors for the target contaminants. The viruses are then removed by the affinity binding of the viral proteins of the contaminants and their corresponding immobilized cellular receptors.

A number of other substances have been found successful in the removal of viruses from biological fluids. Cross-linked poly (N-benzyl-4-vinylpyridinium bromide) (BVP resin) was found to be efficient in removing pathogenic human viruses from aqueous solutions (Kawabata et al., 1990). Oxidized coals have been found successful in removing coliphages and waterborne human enteric viruses from seeded water sources (Cloete et al., 1998). Chromatographic removal of hepatitis A virus during the manufacture of human albumin was demonstrated using DEAE-Sepharose® Fast Flow and CM-Sepharose® Fast Flow (Adcock et al., 1998). Thus various chromatographic methods have been developed for the removal of viruses from biological fluids and water.

Filtration is another method that is heavily relied on for the separation of viruses from biological solutions and water. In U.S. Pat. No. 6,110,374 a treatment process for removing microbial contaminants suspended in wastewater is disclosed, which involves adding an agglomerate-promoting agent to the wastewater such that solids aggregate in the volume of wastewater and include the pathogenic organism. The volume of wastewater is then passed through a filter cloth membrane constructed of random web needled polyester felt, in order to remove the microbial contaminants, including viruses. In U.S. Pat. No. 6,365,395 a two-step filtration process is used to remove protein aggregates and viruses from a protein solution. Other materials have also been used to filter viruses from solutions. Modified diatomaceous earth was used in filters, and was found to adsorb enteroviruses and coliphages (Farrah et al., 1991). In U.S. Pat. No. 6,783,713 a process is disclosed for forming an activated carbon fiber filter for removing viruses from liquids. Manabe et al (U.S. Pat. No. 4,857,196) developed a novel porous hollow fiber membrane that has been found to be especially useful for the removal of a virus from an aqueous protein solution.

In addition to viral contamination, endotoxin contamination of biological solutions is also a common problem. Plasmid DNA production depends on fermentation processes for the Gram-negative bacterium E. coli, as does the production of many pharmaceuticals. Endotoxins are a class of lipopolysaccharides which are an integral part of the outer membrane of Gram-negative bacteria, and are responsible for their organization and stability. Although the endotoxins are anchored firmly in the cell wall, they are continuously liberated into the environment through cell death, growth and division. Bacterial endotoxins show strong biological effects at very low concentrations in human beings and many animals when entering the blood stream, including sepsis and septic shock, leading to severe hypertension, cardiovascular collapse, multiple organ failure and death. Thus the FDA has deemed them unacceptable in preparations to be administered to humans (Petsch and Anspach, 2000).

There is no generally applicable method for endotoxin removal available. Ultrafiltration, which is used for water purification, has little effect on low endotoxin levels present in protein solutions. Thus, there have been many methods developed, including ion-exchangers, two-phase extraction and affinity techniques, as well as tailor-made endotoxin-selective adsorber matrices for endotoxin removal (Anspach, 2001). For research purposes, multiple CsCl banding of plasmid DNA has been used as a method for removing endotoxins. However, this method does not completely remove endotoxins, and it is time-consuming and uses a number of toxic substances.

As stated, ultrafiltration has been used for the removal of endotoxins from water and other solutions (Li and Lou, 1989, Li and Lou, 1999). Ultrafiltration using membranes with about 10 kDa nominal-molecular-weight cutoff is routinely employed to obtain ultrapure water in laboratory systems (Petsch and Anspach, 2000). An ultrafiltration device has also been found effective in reducing endotoxin concentrations in bicarbonate dialysis fluids (Loiver et al., 1992). In U.S. Pat. No. 5,221,483 a single filtration device containing coated filter membranes and absolute pore filters is disclosed that is used to remove endotoxins and viruses. A filter and filter device for endotoxin removal is disclosed in U.S. Pat. No. 6,849,185.

The use of ion-exchangers and affinity adsorbers is the most wide-spread method of endotoxin removal and reduction. In U.S. Pat. No. 6,194,562 a method for endotoxin removal from nucleic acids, such as RNA, DNA or hybrids thereof is described. The method relies on removing endotoxins from solutions using silica-based materials, such as silica gel particles, magnetic silica particles, or diatomaceous earth. In U.S. Pat. No. 6,365,147 endotoxin removal from biological solutions is described using an immobilized metal affinity chromatography matrix composed of a metal such as iron, bound to a resin, wherein the metal is capable of selectively binding endotoxin in the solution. In U.S. Pat. Nos. 5,747,663 and 6,669,386 endotoxin removal using different chromatographic materials is described. A method for removing endotoxins from nucleic acids, by pre-incubating the nucleic acids in a salt-free detergent solution and subsequent anion exchange chromatography on a tentacle anion exchanger is disclosed in U.S. Pat. No. 6,617,443. Furthermore, a method for the removal of endotoxins from potable water has been described in U.S. Pat. No. 6,106,723. This method produces ultrapure water to meet the needs of hemodialysis and other biological applications. In this method, source water is processed by a combination of membrane and chromatographic methods including reverse osmosis, ion exchange deionization, endotoxin-specific adsorption steps and polishing filtration to reduce contamination levels below those specified by the FDA (the U.S. Food and Drug Administration).

Affinity adsoption relying on various molecules has also been employed for endotoxin removal. Polymyxin B has shown good clearance of endotoxin (Issekutz, 1983), and has been used in various forms including immobilized on Sepharose (Karpus et al., 1987), with membrane support (Petsch et al., 1997), and with fiber support (Tant et al., 1992). The use of immobilized histidine has also met with varying success, with the histidine being immobilized with Sepharose resin support (Matsumae et al., 1990), with filter-paper support (Gao et al., 1997), or with hollow fiber membrane support (Legallis et al., 1997). Other chromatographic methods have included the use of deoxycholic acid, polycationic ligands (PEI, PLL, PLH), as well as polymeric matrices with cationic functional groups such as spherical porous poly (γ-methyl-L-glutamate) beads (Anspach, 2001).

A novel method for endotoxin removal has been developed by Wainwright and Novitsky, and involves the use of endotoxin binding/neutralizing proteins capable of binding endotoxin in vivo, thereby neutralizing the toxic effect or bioactivity of endotoxin (U.S. Pat. Nos. 5,747,455, 6,222,021, 6,384, 200). Thus, there are clearly numerous methods that can be used to remove endotoxins from biological fluids, and the method to be used depends on the fluid in question.

The removal of prions from solutions to be used in biological applications is also very important. Prions are infectious agents composed exclusively of a single sialoglycoprotein called PrP 27-30. They contain no nucleic acid, and cause a number of neurodegenerative diseases in humans. There are currently very few methods for the removal of prions from biological solutions. Traditional methods for treating prions have involved their inactivation, typically by heating to temperatures higher than 130° C. and treatment with concentrated sodium hydroxide solution. Other methods of lowering prion activity include treatment with organic solvents, detergents, protein-denaturing agents, chaotropic salts and phenol. However, these methods cannot be applied to most biological solutions as such high heat and harsh treatment will lead to the denaturation and destruction of the biological of interest.

There are very few patents that deal with the removal of prions from biological solutions. In U.S. Pat. No. 5,808,011 the removal of prions from a solution containing the prion and at least one other biomolecule is disclosed that involves directing the solution through an anion-exchange chromatography column under conditions that cause a gradient elution, whereby the prion is separated by eluting in a different fraction than the biomolecule. In U.S. Pat. No. 6,372,510 prions are removed from aqueous protein solutions by treating the solution with simultaneous electrostatic adsorption and hydrophobic chromatography.

The same methods that are used for the removal of viruses could in theory also be used for the removal of prions, including filtration, selective adsorption, and chromatography. The transmissible character of prions is very powerful, and no chromatographic methods are currently available that are known to remove, with certainty, the last traces which may contaminate complex biological solutions. Filtration methods have been suggested for this purpose, but the size of pores selected to stop prions also stops large proteins, because either the protein has a diameter that is greater than that of the pore or because adsorption phenomena complicate filtration of the protein. Thus there are a number of problems with the current methods for prion removal.

Bacterial contamination in biological fluids and water is also a problem. Traditionally, the removal of bacteria has been accomplished by filtration, including microfiltration and membrane filtration. Regulatory agencies have set forth minimum standards for the amount of bacteria that is acceptable in drinking water, and currently 99.999% must be removed. A few novel methods have been developed for the removal of bacteria from aqueous solutions. In U.S. Pat. No. 5,432,077 methods for the removal of impurities from aqueous materials by contact with an adsorptive product are disclosed. And in U.S. Pat. No. 5,242,595 bacterial removal by passing a bacteria-containing liquid through a plural-coated-sintered inorganic membrane on a larger pore size inorganic ceramic support is disclosed.

A significant benefit for the removal of adventitious agents would be a single device capable of removing more than one type of contaminant. In U.S. Pat. No. 4,791,063 a polyionene-transformed modified polymer-polysaccharide separation matrix is disclosed that can be used to remove various contaminants of microorganism origin from biological liquids. In U.S. Pat. No. 6,827,854 a filter and filter materials for removing microorganisms from a fluid are provided. And in U.S. Pat. No. 6,838,005 aluminum hydroxide fibers are used in a filter with other fibers or particles, and the filter is shown to filter bacteria and viruses at high flux. These methods all have the benefit that they are capable of removing multiple types of contaminants.

There are a number of problems with the current known methods for removal of contaminants from biological fluids. Often times, the contaminant removal efficiency of some of the current membranes is limited because the binding capacity of the contaminant is low, and this leads to early breakthrough of the contaminant into the filtered fluid. Some of the methods employed for contaminant removal, particularly for endotoxin removal, are difficult to employ successfully in industry because of the very small amount of occurring contaminant. Additional problems with chromatography include the fact that it is often difficult for proteins and larger biomolecules to diffuse through the narrow pores, excessive binding and distortion of the protein structure may occur, and the matrix is often hydrophobic and can cause denaturation of the proteins. Furthermore, non-specific adsorption often occurs and can lead to the loss of the biological of interest.

Problems encountered with filtration include the buildup of slime on the filter and the filter becoming clogged, particularly during the filtration of bacteria. Due to the small pore size of nanofilters, it is often difficult to filter biological liquids through a nanofilter. Furthermore, it has been found with the filtration of viruses that the filters are generally not absolute filters, and the passage of small viruses through the filter frequently occurs. This may be due to pressure being applied to the filter and the filter subsequently breaking, or the virus may change in size due to the sheer force and thus pass though the membrane.

As a result, the demand for reproducible, controllable, and rapid processes for the removal of viruses, endotoxins, prions and bacteria from water, buffers, solutions, and biological preparations of DNA or proteins has persisted. Further, it is desirable that such processes be inexpensive, allow for the inactivation of the adventitious agent and be regenerable.

BRIEF DESCRIPTION OF THE DRAWINGS

In drawings which illustrate by way of example only a preferred embodiment of the invention.

DETAILED DESCRIPTION OF THE INVENTION

The present invention provides for a method of removing adventitious materials from a fluid by passing the fluid through a column or filter bed comprised of silicon carbide particles, or through mixing the fluid with a silicon carbide slurry. In particular, the present invention provides an economical, reproducible and regenerable process for the removal of viruses, endotoxins, prions and bacteria from water, buffers, solutions, and biological preparations of DNA and proteins based on the use of silicon carbide, preferably commercially available industrial quality silicon carbide. A typical industrial preparation of silicon carbide (SiC) which is applicable for use in removal of adventitious agents is composed of 97.8% silicon carbide and small amounts of silicon dioxide, silicon, iron, aluminum and carbon. This substance is affordable and readily available to be used in a column, a filter, or as a slurry for adventitious agent removal. Silicon carbide is available in a variety of grit sizes or grades, and each grade has a different average particle size. Any grade of SiC can be used in the method according to the present invention, with a preferred grit size for the columns being 2500. The preferred grade will depend on whether it is being used in a small spin column, a large column, a filter or a slurry.

Silicon carbide offers a number of key benefits when used as a column chromatography media, filtration media or slurry for the removal of adventitious agents. First of all, silicon carbide is chemically inert, and thus will be non-reactive with any substances that may be present in the solution, including proteins or DNA. Furthermore, because it is non-biodegradable, there will be no leaching of the silicon carbide into the purified fluid. Silicon carbide has also been found to be extremely stable in both acid and base treatments, as well as heat. Silicon carbide is also incompressible, thus pressure across the filter or column will not build up because of compression. Another benefit that silicon carbide offers is that it can be cleaned and re-used, thus making it environmentally friendly. In order to clean and regenerate the resin, a combination of washing and elution steps must be performed. Backwashing may be employed to loosen and remove any mechanically retained substances, while washing and elution will be used to remove any substances which have become absorbed to the silicon carbide. These recovered adventitious agents can then be inactivated through various methods including chemical treatment, such as washing the resin with a strong acid followed by washing with a strong base. Lastly, the silicon carbide columns, filters and slurry with bound adventitious agents can be autoclaved in order to inactivate the adventitious agents through the use of high temperature and high pressure.

In an embodiment of the present invention, there is provided a method for the removal of adventitious materials from fluids, by passing the fluids through a column packed with particles of silicon carbide, such that the adventitious agent binds to the column and the fluid that passes through the column can be collected and used in other applications. Alternatively, the molecule of interest may bind to the resin in the column while the adventitious agent flows through, and the molecule of interest can then be eluted from the resin into a desired fluid to be used in other applications. The columns can be made in various sizes, from small spin columns all the way to large chromatography columns operating through the use of gravity or pumps. Once bound to the silicon carbide, the adventitious agents can then be inactivated through treating the column with heat, such as autoclaving the column at 120° C. for 30 minutes, or through the use of chemical treatments. Chemical tratements to inactivate the adventitous agent could include washing the column with the bound adventitious agent with 1 bed volume of 1M HCl, followed by washing with 1 bed volume of 1M NaOH. Alternatively, if the adventitious agent was removed from the column in the flowthrough, the flowthrough may be treated with heat or chemicals in order to inactivate the adventitious agent. A secondary objective of the exemplary methods was the regeneration of the column by passing a liquid or liquids through the column for the purpose of removing and recovering the adventitious agent for inactivation, and simultaneously regenerating the column.

In another embodiment of the present invention, there is provided a method for the removal of adventitious materials from fluids, by passing the fluids through a filter bed of silicon carbide particles such that the fluid that passes through the filter can be collected and used in other applications. The filter can be used as a cake filter, a pressure filter, a vacuum filter, a deep bed filter or a surface filter. The liquid containing the adventitous agent can be passed through the filter by gravitational force or mechanical means. The adventitious agents can then be inactivated through treating the filter with heat or chemicals. The filter may also be regenerated, by passing liquids through the filter for the purpose of removing and recovering the adventitious agent for inactivation and simultaneously regenerating the column.

In one embodiment of the invention the first step is the generation of the column containing SiC. A silicon carbide slurry for packing in a column can be prepared according to the following description: A 50% weight/volume (w/v) slurry of silicon carbide is prepared in 0.1 M guanidine hydrochloride with constant mixing for 20 minutes. The slurry can then be packed into small polypropylene columns, which have been fitted with a membrane sandwiched between 2 fiber filters. Generally, either 25 or 50 mg of resin is packed into each spin column, and the columns are then spun down in order to properly pack the resin. Lastly, a top frit is placed over the resin bed which is generally between 0.2 and 0.45 microns.

In general, the binding or removal of each adventitious agent from a fluid using the silicon carbide column will be slightly different, depending on the adventitious agent to be removed and the presence of other substances in the fluid. Each situation requires extensive testing in order to remove the agent of interest while leaving behind the components of the fluid that are to be used in other applications. In some cases, pre-treatment of the fluid containing the adventitious agent is required. In other cases, different types of silicon carbide that have undergone various treatments are required. In still other cases, various wash or binding solutions will be required.

If there is simply an adventitious agent that is to be removed from either water or a buffer solution, generally the solution will be passed through the column under conditions wherein the agent will bind to the column while the purified liquid will flowthrough and be collected. The column can then either be chemically treated or autoclaved in order to destroy the agent. Alternatively a solution can be passed through the column such that the agent is eluted and can be inactivated, and the column is simultaneously regenerated such that it can be used again.

In the situation where the adventitious agent is present in a solution with DNA or proteins, the general strategy would proceed in one of two ways. In the first case, the binding conditions for the column would be chosen such that the adventitious agent would bind to the column while the protein or DNA of interest would flowthrough the column in the fluid. In this case, the fluid could be used in other applications, and the adventitious agent would either be inactivated on the column, or a solution could be passed through the column such that the adventitious agent is eluted and can be inactivated, simultaneously regenerating the column. In the second strategy, the protein or DNA of interest would bind to the column while the adventitious agent would pass through into the flowthrough. The DNA or protein of interest could then be eluted into a clean solution and used in other applications, and the adventitious agent could be inactivated through either heat or chemicals.

Figure 1:
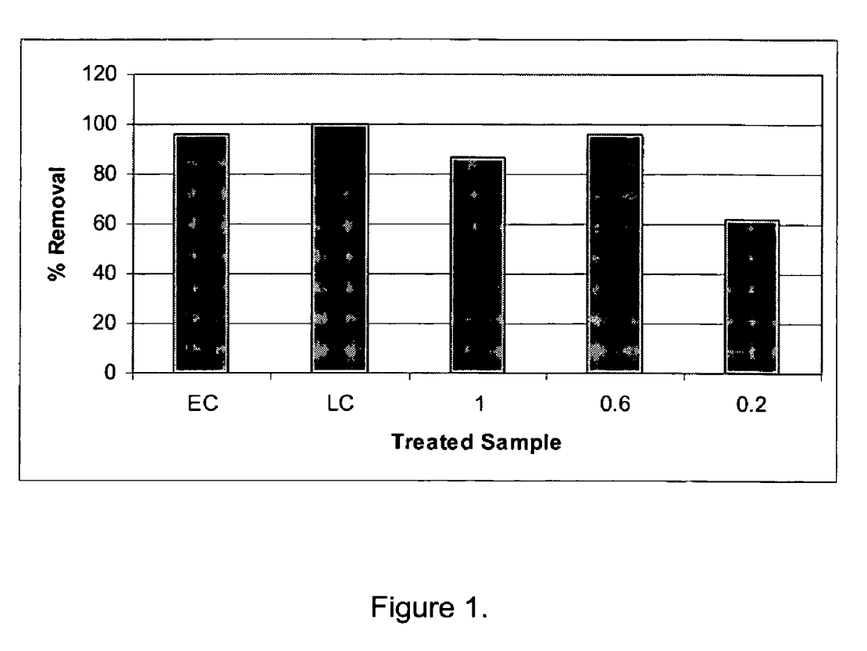
FIG. 1 is a graph depicting endotoxin removal from 35 µg lysozyme samples spiked with endotoxin using silicon carbide columns and isopropanol as an emulsifier.

In one embodiment of the present invention, endotoxins were removed from a protein solution using a 25 mg silicon carbide spin column that was prepared as described above. In this case, samples containing 35 μg of lysozyme were spiked with increasing amounts of endotoxin (0.2, 0.6 and 1.0 EU/mL). EU stands for Endotoxin Unit. These samples were then brought up to 175 μL with Tris buffer such that the final concentration of the buffer was 25 mM, and the pH was neutral. Equal volumes of the emulsifier, isopropanol, were then added to the sample, bringing the volume to 350 μL. These samples were then loaded onto the column by spinning the column for one minute at 14,000×g. At this point, the proteins will bind to the silicon carbide particles in the column while the endotoxins will flowthrough. The columns with bound protein were then washed with a solution containing the Tris buffer and isopropanol, and lastly the lysozyme samples were eluted using 50 μL of 50 mM sodium phosphate, pH 12.5. By using the isopropanol in the binding and wash steps, up to 96% of the endotoxins were found to be removed. Furthermore, the recovery of the lysozyme was still high. Thus, endotoxins can be removed from a protein solution using a column packed with silicon carbide particles, without compromising protein recovery.

FIG. 1 is a graph depicting endotoxin removal from 35 μg lysozyme samples spiked with endotoxin using isopropanol as an emulsifier. Endotoxin was removed by passing the protein solution through a silicon carbide column. EC is the endotoxin control, LC is the lysozyme control, and 1, 0.6, and 0.2 correspond to the EU/mL of endotoxin that were used to spike the lysozyme samples prior to loading onto the column.

Figure 2:
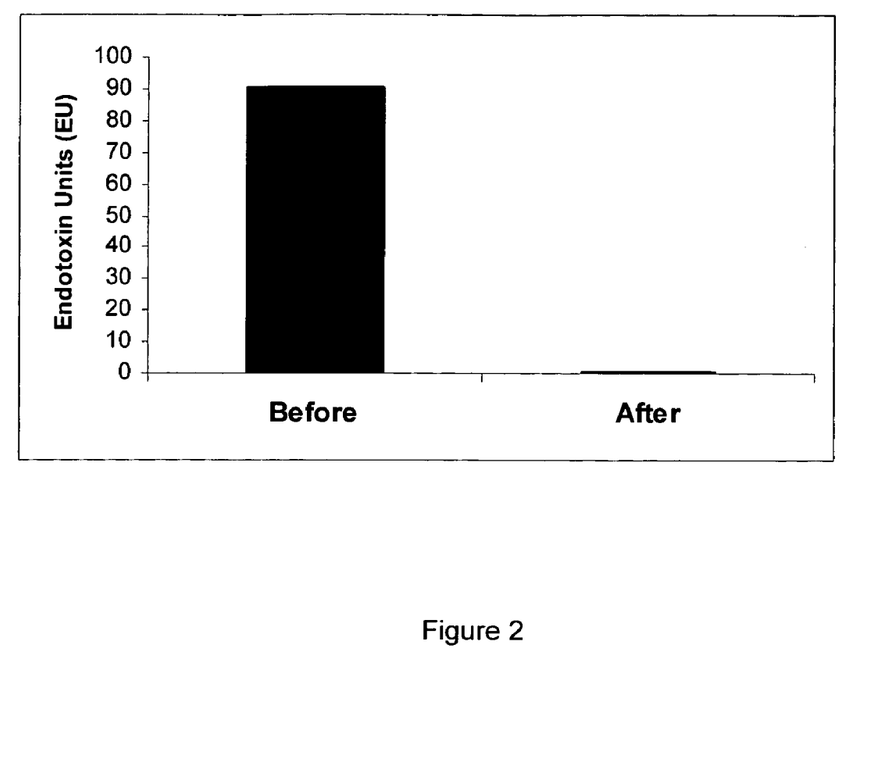
FIG. 2 is a graph depicting endotoxin removal from 50 µg BSA samples spiked with endotoxin using silicon carbide columns with isopropanol and Triton® X-114.

In another embodiment of the present invention, endotoxins were again removed from protein solutions using a 25 mg silicon carbide spin column that was prepared as described above. In this case, three samples containing 50 μg of BSA were spiked with 87.5 EU of endotoxin each. The samples were then brought up to 500 μL with water. Next, 20 μL of a solution containing 0.8333M of phosporic acid, citric acid and sodium hydroxide was added to the samples, and 5 μL of Triton® X-114 was added to a final concentration of 1%. The samples were then mixed, and 50 μL of isopropanol was added to the samples. The samples were loaded onto silicon carbide columns that had been previously activated through 2 washes with 500 μL of 12.5 mM phosphoric acid, 12.5 mM citric acid, and 22.5 mM sodium hydroxide. The endotoxins flowed through the column, while the BSA was preferentially bound to the silicon carbide. The columns were then washed twice with 500 μL of the same phosphoric acid solution. The BSA samples were eluted using 50 μL of 10 mM sodium phosphate, pH 12.5. The endotoxin levels in the final elutions were determined to be an average of 0.6 EU, with protein recoveries of over 92%. Thus, endotoxins levels can be reduced by greater than 99% in protein solutions using a column packed with silicon carbide particles without compromising protein recovery.

FIG. 2 is a graph depicting endotoxin removal from 50 μg BSA samples spiked with endotoxin using isopropanol and Triton® X-114. Endotoxin was removed by passing the protein solution through a silicon carbide column. The first bar indicates the average amount of endotoxin in the inputs, while the second bar indicates the average amount of endotoxin in the outputs after the samples were passed through a silicon carbide spin column.

Figure 3:
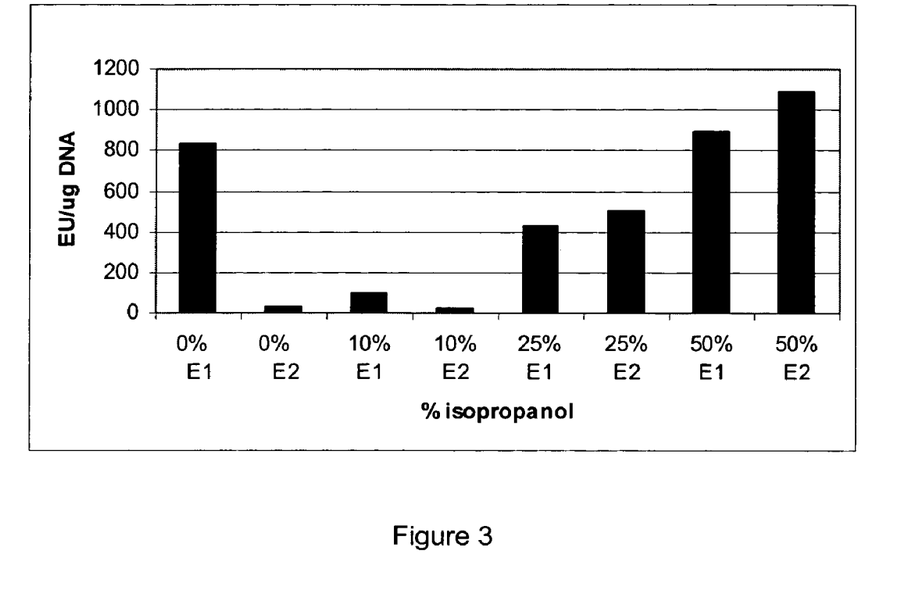
FIG. 3 is a graph depicting endotoxin removal from bacterial lysate using silicon carbide columns in the presence of 1% Triton® X-114 and increasing amounts of isopropanol.

In another embodiment of the present invention, silicon carbide columns were used to remove endotoxins from a bacterial lysate harboring pUC-based plasmid DNA. The columns were prepared as described above, using 25 mg of silicon carbide. In this case, the columns were first equilibrated by passing 400 μL of 0.1M guanidine hydrochloride through the columns twice at 14,000 rpm. Triton® X-114 was then added to 300 μL lysate samples to a final concentration of 1%. These mixtures were allowed to stand for 5 minutes, and then increasing amounts of isopropanol were added to the samples (0, 10, 25 and 50%). The samples were mixed well, and spun down for 5 minutes at 8,000×g. The clarified lysates were then applied to columns, such that the plasmid DNA could bind while the endotoxins were removed in the flowthrough. The columns were then washed twice with 400 μL of TE buffer and ethanol, and the purified plasmid DNA was then eluted using 2 spins of 25 μL of TE buffer, pH 11.75. For this particular case, it was found that 10% isopropanol mixed with 1% Triton® X-114 showed the highest removal of endotoxins while maintaining the highest recovery of plasmid. DNA. As low as 22 EU/μg of DNA were achieved, compared to 1335 EU/μg for untreated lysate. Thus silicon carbide columns can be used to remove endotoxins from bacterial lysate when both isopropanol and Triton® X-114 are used in the sample preparation prior to loading the sample onto the column.

FIG. 3 is a graph depicting endotoxin removal from bacterial lysate using silicon carbide columns in the presence of 1% Triton® X-114 and increasing amounts of isopropanol. E1 corresponds to the first elution, and E2 corresponds to the second elution in each case.

Figure 4:
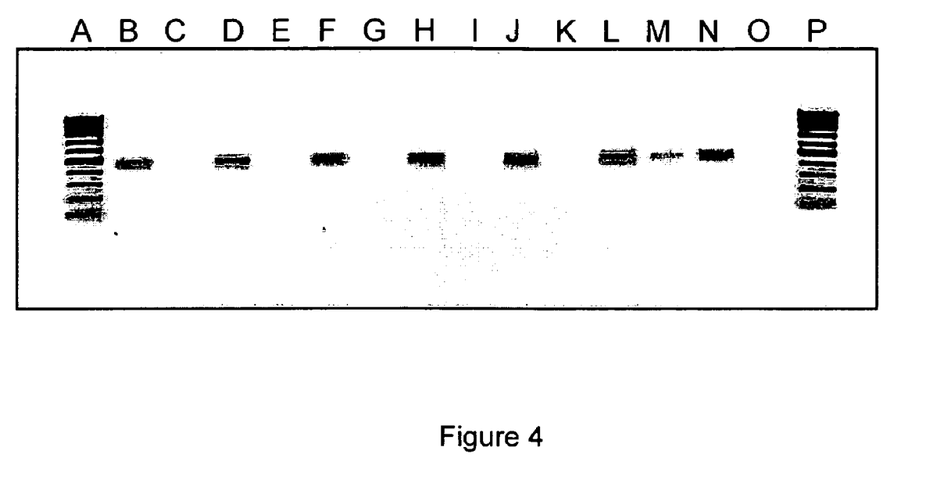
FIG. 4 is an agarose gel depicting removal of adenovirus dl309 from a PBS buffer using a silicon carbide column by showing the PCR detection of a 470 bp region located in the E1 region of the virus.

In another embodiment of the preferred invention, columns packed with silicon carbide particles were used to remove adenovirus dl309 from a PBS buffer. The columns were prepared as described above. In order to demonstrate viral removal, viral dilutions that contained $1.18 \times 10^8$ particles, $2.4 \times 10^8$ particles, $3.6 \times 10^8$ particles, $4.8 \times 10^8$ particles, $6.0 \times 10^8$ particles and $7.1 \times 10^8$ were prepared in PBS buffer in duplicate. One set of the dilutions was passed through 25 mg silicon carbide columns that had been previously activated with 350 μL of PBS buffer. The other set of dilutions were not passed through the columns and were used as controls. Viral DNA was then isolated from both the column flowthroughs and the controls. This DNA was used as the template in a PCR assay, which was previously found to be sensitive enough to detect DNA from a single viral particle. It was found that for the samples containing $1.18-6.0 \times 10^8$ particles, all the virus present was binding to the columns, as no viral DNA could be detected in the flowthrough. However, for the $7.1 \times 10^8$ particle sample, viral DNA was indeed detected in the flowthrough, as evidenced by the PCR assay. Thus it could be concluded that a large number of adenoviral particles can be removed from PBS buffer using a silicon carbide column, and that the binding capacity of dl309 for a 25 mg column lies between $6.0 \times 10^8$ particles and $7.1 \times 10^8$ particles.

FIG. 4 shows an agarose gel depicting removal of adenovirus dl309 from a PBS buffer using a silicon carbide column. PCR of a 470 bp region located in the E1 region of the virus was used to detect the presence of a single virus. Lanes A and P correspond to the PCR Sizer Marker, Lanes B and C correspond to $1.18 \times 10^8$ viral particles that were not column processed (B) and column processed (C); Lanes D and E correspond to $2.4 \times 10^8$ viral particles that were not column processed (D) and column processed (E); Lanes F and G correspond to $3.6 \times 10^8$ viral particles that were not column processed (F) and column processed (G); Lanes H and I correspond to $4.8 \times 10^8$ viral particles that were not column processed (H) and column processed (I); Lanes J and K correspond to $6.0 \times 10^8$ viral particles that were not column processed (J) and column processed (K); Lanes L and M correspond to $7.1 \times 10^8$ viral particles that were not column processed (L) and column processed (M). Lane N is a positive control and Lane O is a negative control.

Figure 5:
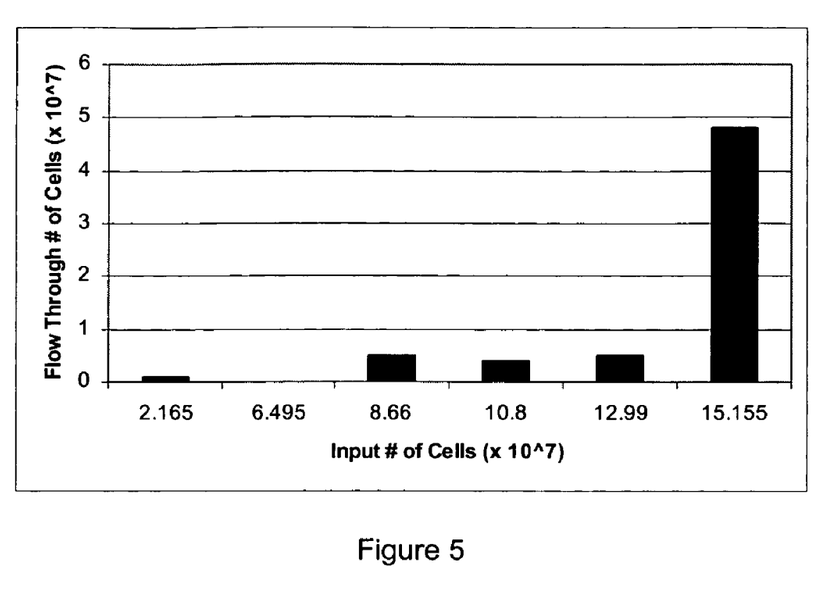
FIG. 5 is a graph showing the number of viable cells present in the flow through after passing increasing amounts of bacterial cells through a silicon carbide column.

In another embodiment of the preferred invention, a silicon carbide column is used to remove bacteria from a liquid. The column is again packed as described above, however it contains a 0.6 micron top frit. In this case, the column is used to remove bacteria from a suspension. A bacterial culture was grown in LB medium, and a viable count of the cells was obtained by colony summation. Dilutions of the culture were then prepared, and applied to the columns by 30 second centrifugation at 14,000 rpm. The flowthrough from the columns was then plated on ampicillin selective agar plates, and a viable cell count was obtained. It was found from this procedure that up to 96% of viable cells were either retained on the column, or were sheared as a result of their passage through the column and their interaction with the sharp particles of silicon carbide. Thus, silicon carbide columns can be used to remove and/or destroy viable bacterial cells from a liquid.

FIG. 5 is a graph showing the number of viable cells present in the flowthrough after passing increasing amounts of bacterial cells through a silicon carbide column.

Figure 6:
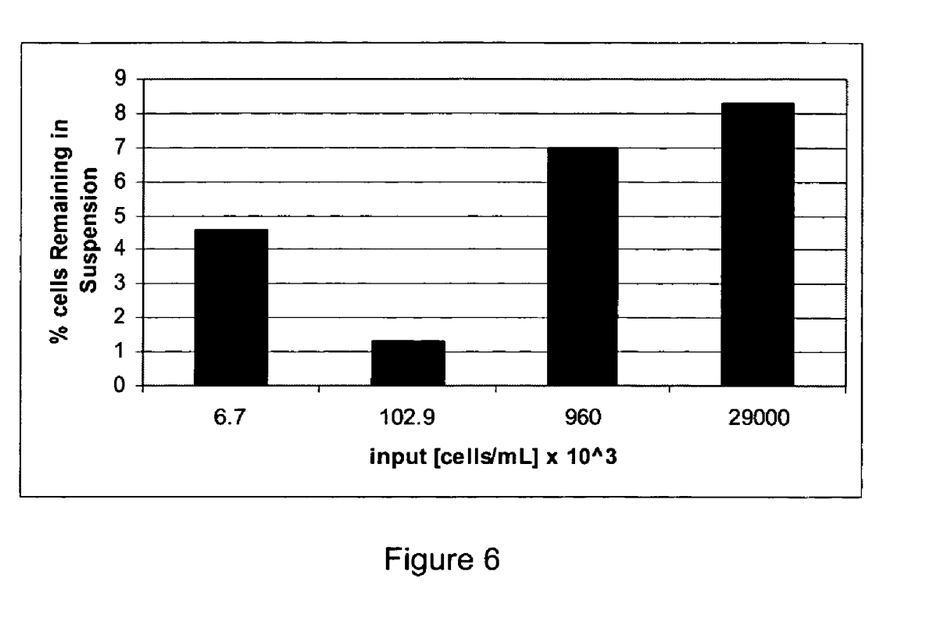
FIG. 6 is a graph depicting bacterial removal from a suspension of bacterial cells using a slurry containing 1 gram of silicon carbide.

In another embodiment of the preferred invention, a silicon carbide slurry was used to remove bacteria from a liquid, in order to eliminate the sheer stress caused by centrifugation using a column format. Bacterial cells harbouring plasmid DNA were cultivated to a specific optical density. A viable count of the cells was obtained by colony enumeration, and 10 fold dilutions of cells were applied to separate test tubes that contained 1 g SiC. The bacterial cells were mixed with the resin by gentle inversion for 30 seconds whereupon the resin was allowed to settle. After 15 minutes of settling, samples were then taken from the test tubes, diluted, and plated onto ampilcillin selective agar plates. A viable count of the cells was then tabulated. It was found that the percentage of cells that were being retained and/or damaged by the resin in some manner is between 92 and 98%. Thus, silicon carbide slurry can be used to remove bacteria from a fluid such as water. The slurry could then be autoclaved or treated with chemicals in order to destroy the bacteria. Alternatively, a series of wash steps could be performed in order to remove the bacteria from the resin. The resulting wash liquid could then be treated to destroy the bacteria, and the slurry would then be regenerated and could be used again.

FIG. 6 is a graph depicting bacterial removal from a suspension of bacterial cells using a slurry containing 1 gram of silicon carbide. It was found that the slurry was able to remove between 92 and 98% of bacterial cells.

While these examples and embodiments have demonstrated the removal of one adventitious agent at a time using silicon carbide, it should be apparent to those skilled in the art that variations and modifications of these methods may be made without departing from the invention and be used to remove combinations of adventitious materials from fluids. The invention includes all such variations and modifications as fall within the scope of the appended claims.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A method for removing adventitious materials from a fluid, comprising passing the fluid through a column containing a chromatography medium consisting of silicon carbide, wherein the adventitious materials are at least one of endotoxins, prions, viruses or bacteria, or any combination thereof, and the fluid may be water, buffers, aqueous solutions or biological preparations of nucleic acids or proteins, or any combination thereof.

2. A method for removing adventitious materials from a fluid, comprising passing said fluid through a filter bed consisting of silicon carbide, wherein the adventitious materials are at least one of endotoxins, prions, viruses or bacteria, or any combination thereof, and the fluid may be water, buffers, aqueous solutions or biological preparations of nucleic acids or proteins, or any combination thereof.

3. A method for removing adventitious materials from a fluid, comprising contacting said fluid containing adventitious materials with silicon carbide in the form of a slurry, wherein the adventitious materials are at least one of endotoxins, prions, viruses or bacteria, or any combination thereof, and the fluid may be water, buffers, aqueous solutions or biological preparations of nucleic acids or proteins, or any combination thereof.

4. The method of any of claims 1-3, wherein the adventitious materials bind to the silicon carbide and the remaining fluid is collected for use in other applications.

5. The method of any of claims 1-3, wherein the nucleic acid or protein binds to the silicon carbide and the adventitious materials remain unbound and are removed in the flowthrough.

6. The method of claim 5, wherein the bound nucleic acid or protein is eluted from the silicon carbide into a desired fluid to be used for other applications.

7. The method of claim 4, wherein the silicon carbide with the bound adventitious materials is treated with heat to inactivate the adventitious materials.

8. The method of claim 4, wherein the silicon carbide with the bound adventitious materials is treated with chemicals to inactivate the adventitious materials.

9. The method of claim 8, wherein the chemicals include a strong acid and base treatment.

10. The method of claim 8, wherein the silicon carbide with the bound adventitious materials is washed with 1M HCl followed by a washing with 1M NaOH.

11. The method of claim 4, further comprising the step of washing the silicon carbide using at least one liquid with the purpose of removing and recovering the adventitious materials for inactivation and simultaneously regenerating the silicon carbide.

12. The method of claim 5, wherein the flowthrough containing the adventitious materials is treated with heat to inactivate the adventitious materials.

13. The method of clam 11, wherein the flowthrough containing the adventitious materials is treated with heat to inactivate the adventitious materials.

14. The method of claim 5, wherein the flowthrough containing the adventitious materials is treated with chemicals to inactivate the adventitious materials.

15. The method of claim 11, wherein the flowthrough containing the adventitious materials is treated with chemicals to inactivate the adventitious materials.

16. The method of any of claims 1-3, wherein the adventitious materials are bacteria and the bacteria are reduced by at least 90%.

17. The method of any of claims 1-3, wherein the adventitious materials are endotoxins and the endotoxins are reduced by at least 90%.

* * * * *